United States Patent
Neter et al.

(10) Patent No.: US 8,182,261 B2
(45) Date of Patent: *May 22, 2012

(54) BOTTOM INSERT WITH HEAT INSULATION

(75) Inventors: Witold Neter, Newnan, GA (US); Helmut Thömmes, Kastel (DE); Stefan Schweininger, Wiesbaden (DE)

(73) Assignee: MHT Mold & Hotrunner Technology AG, Hochheim (DE)

(*) Notice: Subject to any disclaimer, the term of this patent is extended or adjusted under 35 U.S.C. 154(b) by 586 days.

This patent is subject to a terminal disclaimer.

(21) Appl. No.: 12/226,758

(22) PCT Filed: May 3, 2007

(86) PCT No.: PCT/EP2007/054298
§ 371 (c)(1),
(2), (4) Date: Mar. 9, 2009

(87) PCT Pub. No.: WO2007/128770
PCT Pub. Date: Nov. 15, 2007

(65) Prior Publication Data
US 2009/0324770 A1    Dec. 31, 2009

(30) Foreign Application Priority Data
May 6, 2006  (DE) .................. 10 2006 021 229

(51) Int. Cl.
*B29C 45/73* (2006.01)
(52) U.S. Cl. .................. 425/533; 425/552
(58) Field of Classification Search .......... 425/533, 425/552
See application file for complete search history.

(56) References Cited

U.S. PATENT DOCUMENTS

| | | | |
|---|---|---|---|
| 4,622,001 A | 11/1986 | Bright et al. | |
| 5,922,367 A | 7/1999 | Assalita et al. | |
| 6,220,850 B1 | 4/2001 | Catoen et al. | |
| 6,936,199 B2 | 8/2005 | Olaru | |
| 7,798,806 B2 * | 9/2010 | Neter et al. | 425/533 |

FOREIGN PATENT DOCUMENTS

| | | |
|---|---|---|
| DE | 4035194 | 5/1992 |
| DE | 10037739 | 2/2002 |
| DE | 69912485 | 5/2004 |
| EP | 0241040 | 10/1987 |
| GB | 1220607 | 1/1971 |
| JP | 57024220 | 2/1982 |
| WO | WO 03/086734 | 10/2003 |
| WO | WO 2006/047429 | 5/2006 |

* cited by examiner

*Primary Examiner* — Timothy Heitbrink
(74) *Attorney, Agent, or Firm* — Michael L. Dunn

(57) ABSTRACT

A bottom insert for a mold cavity for the production of moldings of plastic material. The mold cavity has a main body with a hot side which has a recess for receiving molten plastic material under pressure and a cold side having a recess, the inside contour of which is intended to come into contact with the molding to be produced and to shape the outside contour thereof. A gate (17) is provided that connects the recess of the hot side to the recess of the cold side and is intended to introduce molten plastic material from the hot side into the cold side. In accordance with the invention there is provided a device for thermal insulation within the bottom insert between the hot side and the cold side of the bottom insert to permit more rapid cooling of the cold side by restricting heat flow from the hot side.

21 Claims, 2 Drawing Sheets

BOTTOM INSERT WITH HEAT INSULATION

BACKGROUND OF THE INVENTION

The present invention concerns a bottom insert for a mold cavity for the production of moldings of plastic material comprising a main body with a hot side which has a recess for receiving molten plastic material under pressure and a cold side having a recess, the inside contour of which is intended to come into contact with the molding to be produced and to shape the outside contour thereof, and a gate which connects the recess of the hot side to the recess of the cold side and is intended to introduce molten plastic material from the hot side into the cold side.

A mold cavity having such a bottom insert is known for example from DE 100 24 625 and is shown in FIG. 1.

The mold cavity is essentially used in the injection molding process. In injection molding the molding material which is in powder form or granulated is plasticised for example in a screw injection molding machine and then urged for example by axial displacement of the screw through the injection passage into the closed, generally cooled tool, for example a mold cavity, as is shown in FIG. 1.

When the mold or the molding cavity provided therein has been filled with the molten material the latter hardens due to cooling. Finally the tool or the mold cavity is opened and the finished molding is removed from the mold and ejected. The tool can be closed again and a fresh working cycle can begin with the renewed injection operation.

In addition, by means of injection molding, it is possible to produce hollow bodies which are inflated for example to form bottles or canisters in a subsequent working step. Those hollow bodies are also referred to as blanks or preforms. The mold cavity which is shown in FIG. 1 and which is known from the state of the art is intended for the production of such preforms. The mold cavity here comprises the actual cavity 1, the core 2, the neck ring 4, the support ring 5 and the bottom insert 6. In the assembled condition shown in FIG. 1 the mold cavity is enclosed or formed by those parts. The multi-part structure of the mold cavity serves inter alia for easy removability of the finished workpiece from the mold and for simple manufacture of the mold cavity itself. The plastic molding material is plasticised and homogenized in a suitable plasticising apparatus (not shown) and passed into the molding space 3 through the opening 8. After cooling of the molding material the molding can be removed from the mold and, in a further working step, held at the screwthread 13 or at the transport ring beneath the screwthread and inflated to form a bottle or a canister.

To achieve as rapid cooling as possible of the molding material and thereby to shorten the cycle time the mold cavity is generally cooled. For that purpose for example peripherally extending cooling grooves 12 are disposed externally on the cavity structure 1. In operation therefore the cavity structure is coaxially surrounded by a further tool portion or a plurality of tool portions so that the cooling grooves 12 form cooling passages with the surrounding tool portion. Disposed within the core 2 is a feed passage 7 through which cooling water can be passed into the core, the water flowing within the passage from left to right in FIG. 1 and then being passed back from right to left between the wall of the passage 7 and the inside wall of the core 2. As can be seen from the drawing the molding space 3 narrows in the proximity of the bottom insert 6. The narrowing contour of the molding space which is formed by the bottom insert 6 is denoted by reference 14 in FIG. 1.

To achieve effective cooling here the bottom insert 6 has a peripherally extending cooling groove 9. The cavity structure 1 has an inlet opening 10 and an outlet opening 11 for water cooling of the bottom insert 6.

For the most part the feed of the molten plastic material is effected by way of a nozzle which is actuated with a needle valve and which extends through the opening 8 of the bottom insert into the recess of the hot side and the outlet of which terminates immediately before the opening or gate of the bottom insert. The bottom insert represents the interface between what is referred to as the hot side of the overall tool and what is referred to as the cold side of the overall tool so that the bottom insert itself has a hot side which is shown at the right in FIG. 1 and a cold side which is shown at the left in FIG. 1. The molten plastic material is prepared under high pressure in the hot side of the tool and the bottom insert. Here it is essential that the molten material including the needle valve are at a working temperature of between about 280 and 285° C. When the needle valve is opened the molten plastic material is introduced into the molding space 3 through the nozzle. The molding space 3 and all surfaces adjoining same, that is to say also the inside wall 14 of the bottom insert, must be cooled as well as possible so that the molten material can harden very quickly and the preform can be removed. The bottom insert 6 must therefore be extremely well cooled on the one hand but on the other hand at its hot side it may not adversely affect the function of the needle valve, that is to say the needle valve must remain at the working temperature. The consequence of this is that the nozzle tip requires an additional heater so that both a heater and also cooling passages which in general are used simultaneously are arranged within the bottom insert 6. That means that rapid cooling of the preform in the mold cavity is only limitedly possible.

DE 100 37 739 proposes arranging a heat barrier element of heat-insulating plastic material between the nozzle and the bottom insert. That can admittedly reduce the heat flow between the nozzle tip on the one hand and the cold side on the other hand, but it makes little change to a considerable temperature gradient being formed within the bottom insert and therefore a large amount of heat flowing from the hot side to the cold side, which heat has to be dissipated by an additional cooling capacity.

BRIEF DESCRIPTION OF THE INVENTION

The object of the present invention is to provide a bottom insert which permits more rapid cooling of the preform in the molding space.

In accordance with the invention that object is attained in that there is provided a device for thermal insulation within the bottom insert between the hot side and the cold side of the bottom insert.

More particularly the invention include a bottom insert for a mold cavity for the production of moldings of plastic material. The mold cavity has a main body with a hot side which has a recess for receiving molten plastic material under pressure and a cold side having a recess, the inside contour of which is intended to come into contact with the molding to be produced and to shape the outside contour thereof. A gate (17) is provided that connects the recess of the hot side to the recess of the cold side and is intended to introduce molten plastic material from the hot side into the cold side. In accordance with the invention there is provided a device for thermal insulation within the bottom insert between the hot side and the cold side of the bottom insert to permit more rapid cooling of the cold side by restricting heat flow from the hot side.

The device for thermal insulation may include a slot (19) provided in the main body, wherein the slot (19) is of such a configuration that by virtue of the provision of the slot (19) the heat transfer surface area, that is to say the area perpendicularly to the flow of heat from the hot side to the cold side, is reduced in the region of the slot, more specifically preferably by at least 30% and particularly preferably by at least 50% and quite particularly preferably by at least 75%. The slot (19) may be provided approximately in the region surrounding the gate. The slot (19) may be so arranged that it surrounds the recess of the hot side at a portion in the proximity of the gate. The slot may include a substantially peripherally extending groove in the main body, wherein the groove is of a depth which is preferably at least twice and particularly preferably at least three times as large the width of the groove. In accordance with the invention, the slot (19) may be at least partially filled with a heat-insulating material.

DETAILED DESCRIPTION OF THE INVENTION

Figure 1:
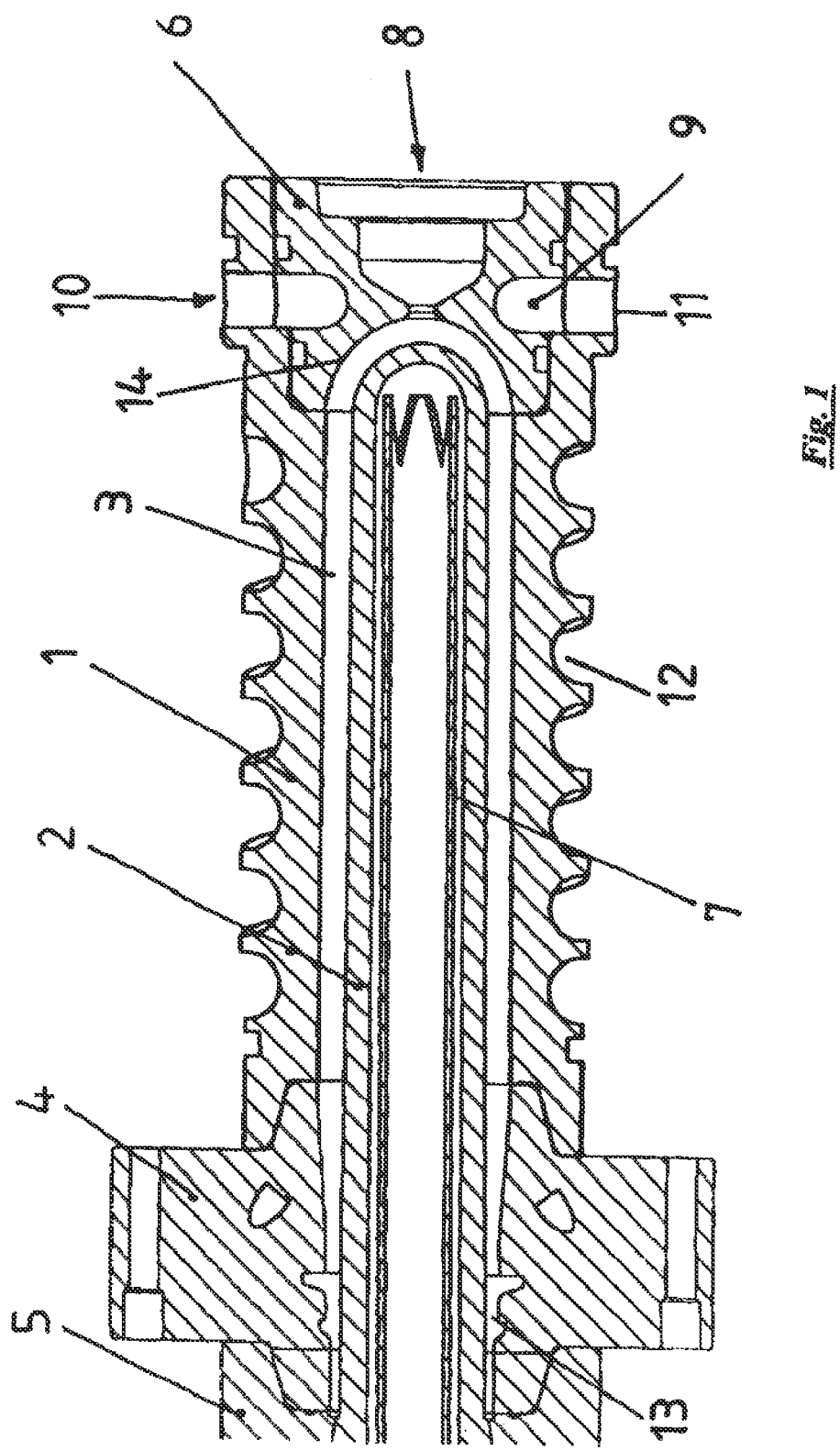
FIG. 1 shows a mold cavity in the state of the art.

In a first preferred configuration the device for thermal insulation comprises a slot provided in the main body, wherein the slot is of such a configuration that by virtue of the provision of the slot the heat transfer surface area, that is to say the area perpendicularly to the flow of heat, is reduced in the region of the slot, more specifically preferably by at least 30% and particularly preferably by at least 50% and quite particularly preferably by at least 75%. The main heat flow from the hot side to the cold side occurs by way of the main body of the bottom insert, that is generally made from a metallic material. The slot according to the invention reduces the heat transfer surface area at the location of the slot so that the magnitude of the heat flow is also considerably reduced thereby.

That measure is based on the consideration that the main part of the heat transfer from the hot side to the cold side of the bottom insert takes place by means of heat conduction. The amount of heat which is transferred by heat conduction is calculated in accordance with Fourier's law as:

$$\dot{Q} = \frac{\lambda \cdot A \cdot \Delta T}{L}$$

wherein $\dot{Q}$ is the amount of heat transported per unit of time, A is the area perpendicularly to the heat flow, L is the thickness of the body through which heat is flowing, $\lambda$ is the thermal conductivity of the material and $\Delta T$ is the temperature difference between the cold and hot sides.

The slot therefore leads to a reduction in the area A and thus a reduction in heat transport.

Advantageously the slot is provided approximately in the region surrounding the gate. It has been found that in a particularly preferred section the slot is best arranged in such a way that it surrounds the recess of the hot side at a portion in the proximity of the gate. In other words the slot is not arranged directly at the gate but displaced a little in the direction of the recess of the hot side. The reason for this is that the shaping contour of the bottom insert generally extends as far as the gate and, for efficient and rapid cooling of the preform, it is necessary for all shaping surfaces to be cooled as effectively as possible. In a preferred embodiment the slot comprises a substantially peripherally extending groove in the main body, wherein the groove is of a depth which is preferably at least twice and particularly preferably at least three times as large as the width of the groove. Basically the groove should be as deep as possible as it is at its most effective if the heat transfer surface area is reduced as much as possible.

The slot can be at least partially filled with a heat-insulating material. In principle however it is entirely sufficient for the slot to be simply filled with air. It will be appreciated that it may not be acted upon with cooling water as then the slot would lose its heat-insulating function.

Another preferred configuration provides that the bottom insert is of a two-part configuration, more specifically with a hot part which has the recess of the hot side and a cold part which has the recess of the cold side. The use of two separate parts means that there is automatically a reduced heat flow between the hot part and the cold part. In addition the two-part structure has the advantage that the two parts can be taken apart for the purposes of maintenance or cleaning.

The hot part is advantageously of such a configuration that it has an opening in opposite relationship to the recess of the hot side, for receiving the cold part. The cold part of the bottom insert is thus fitted into the corresponding recess of the hot part. Sealing integrity of the cold part in relation to the hot part can preferably be effected by means of O-rings.

It is particularly preferred if all surfaces which are provided for contact with the molding to be produced are arranged at the cold part. It is therefore possible for the cold part to be kept at a relatively low temperature while the hot part is kept at a very high temperature, for example at about 280° C., without the heat loss becoming very great.

It can further be advantageous if there is provided at the contact surface between the hot part and the cold part, applied to at least one part, an insulating coating, an insulating membrane and/or a spacing element. That measure provides that the transmission of heat between the cold part and the hot part can be further reduced.

For the most part the bottom insert will have a cooling passage for the feed and discharge of a cooling fluid to and from the cold side.

Advantageously the cold and the hot parts of the bottom insert are of such a configuration that, when the cold part is fitted into the opening in the hot part, a cooling space for receiving cooling fluid remains at least portion-wise between the cold part and the hot part, wherein the cooling space is preferably in the form of part of a ring and is particularly preferably of a substantially ring-shaped configuration. That ensures that the cooling water flows around the cold part and thus highly effectively cools it.

In addition the annular space is advantageously of such a configuration that the surface delimiting the annular space at the cold part extends substantially parallel to the inside surface of the recess of the cold part, which surface comes into contact with the molding. That permits highly efficient cooling of the cold part with cooling fluid as the annular space follows the contour of the inside surface, which is to be cooled, of the recess of the cold side.

The wall thickness of the cold part in the region of the annular space can be further reduced if the cold part has reinforcing elements, for example reinforcing ribs, in the region of the annular space. In principle it is desirable for the annular space to be disposed as closely as possible to the inside surface of the cold part, which comes into contact with the preform to be cooled, as that means that the preform can be very quickly cooled down. It will be noted however that the wall thickness cannot be selected to be too small as then the stability of the cold part is put at risk. The stability of the cold part can be guaranteed by means of the reinforcing ribs, when the wall thickness is selected to be even smaller.

Figure 3:
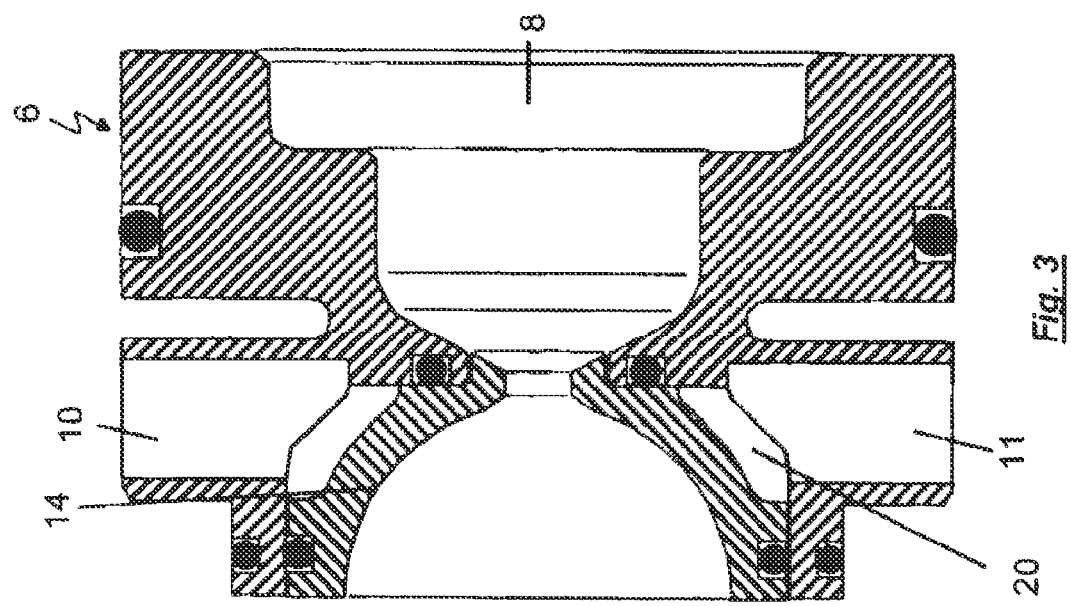
FIG. 3 shows the two-part embodiment of the bottom insert of FIG. 2, wherein the bottom insert is shown in the assembled condition.
Figure 2:
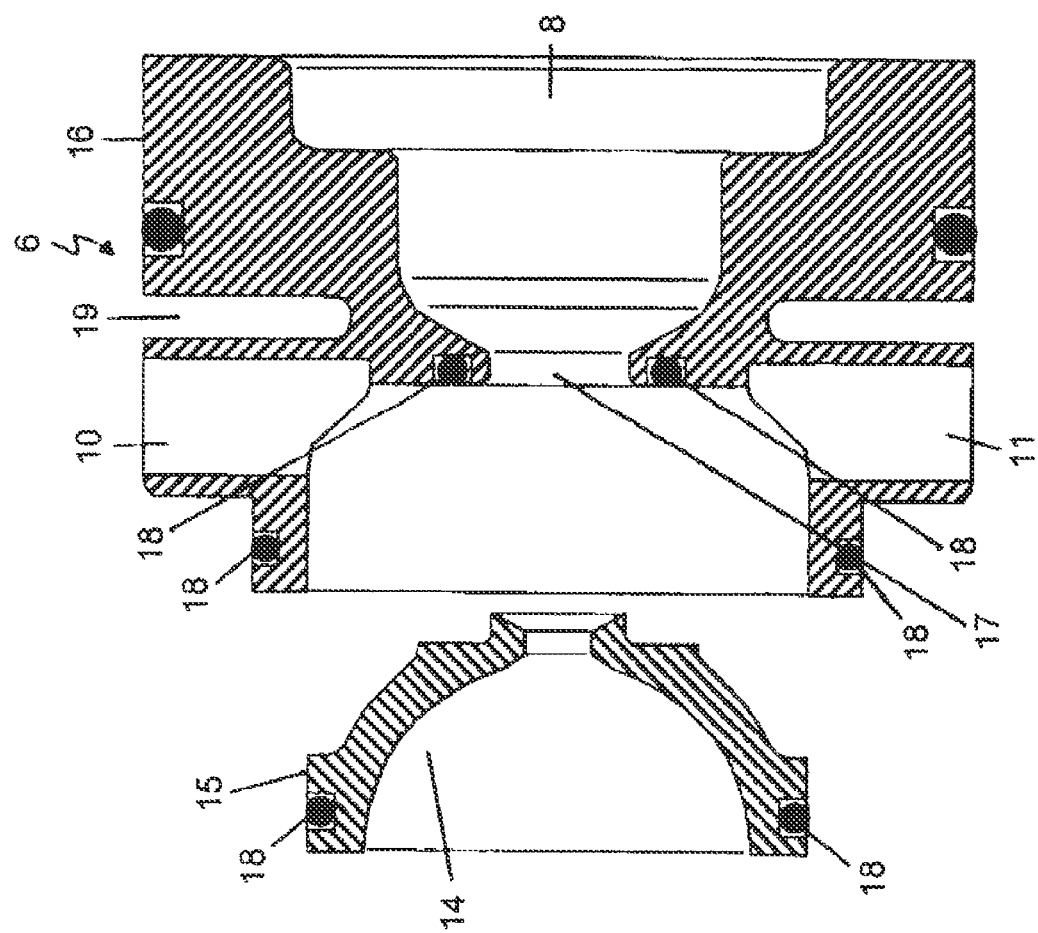
FIG. 2 shows an embodiment according to the invention of the bottom insert, wherein the two parts of the bottom insert are shown in the separated condition.

Further advantages, features and possible uses of the present invention will be apparent from the description hereinafter of a preferred embodiment and the associated Figures. FIG. 1 shows the mold cavity of the state of the art, which has already been described in detail. FIG. 2 shows an embodiment according to the invention of the bottom insert 6 where the bottom insert 6 comprises two parts, namely the cold part 15 and the hot part 16 and FIG. 3 shows the embodiment of FIG. 2 in an assembled condition.

At its hot side the bottom insert 6 has an orifice or recess 8 which serves for the feed of the molten plastic material. Fitted in that opening is the corresponding nozzle which can be opened or closed by means of a needle valve. The nozzle tip must be at a working temperature which is above the melting temperature of the molten plastic material.

The cold part 15 also has an opening, the inside walls of which come into contact with the outside wall of the preform to be produced, in operation. The cold part 15 must be cooled to provide for rapid hardening of the molten material introduced into the molding space. Consequently the temperature gradient from the hot side at the right in FIGS. 2 and 3 to the cold side at the left in FIGS. 2 and 3 is extremely high.

As the main body of the bottom insert 6 is made from a metallic material the heat flow within the bottom insert is considerable. It is therefore proposed that thermal insulation means are provided between the hot side and the cold side.

Thus, for example, as can be clearly seen from FIGS. 2 and 3, an annular groove 19 is provided in the main body of the bottom insert 6. That annular groove 19 provides that the effective material cross-section, that is to say the heat transfer surface area, from the hot side (shown at the right in FIGS. 2 and 3) to the cold side (shown at the left in FIGS. 2 and 3) is considerably reduced.

As the material of the main body of the bottom insert 6 is metallic the essential transfer of heat takes place by metallic thermal conduction within the main body. The simplest method of reducing the heat flow from the hot side in the direction of the cold side is therefore that of reducing the material cross-section or the effective surface area by way of which heat transfer can take place. Therefore it is less the width of the groove 19 that is the important consideration, but primarily the depth of the groove. The smaller the remaining material cross-section or the remaining material cross-sectional area, the correspondingly less is the transfer of heat between the hot side on the one hand and the cold side on the other hand. It will be appreciated that, when selecting the slot 19, consideration is to be given to the fact that the bottom insert must retain a stability and therefore the groove 19 cannot be selected to be of just any depth.

The gap which remains by virtue of the provision of the annular groove 19 can either simply remain filled with air as generally heat transfer through the air molecules remaining in the gap is negligible in relation to heat transfer by way of metallic thermal conduction, or it can be filled with a heat-insulating material. It will be appreciated that the annular groove 19 is not to be acted upon with cooling water as otherwise the separation surface between the hot side and the cold side would only be displaced, but heat transfer would not be reduced.

It can further be seen from FIGS. 2 and 3 that the bottom insert 6 comprises two separate parts 15 and 16. This also leads to a reduction in the transfer of heat between the hot side and the cold side. Sealing integrity for the cold part 15 with respect to the hot part 16 is implemented by means of O-rings 18. In addition the cold part 15 can be removed from the hot part 16 for cleaning or maintenance purposes. In addition, for the situation where the outside contour of the preform to be produced is to be altered, it is only necessary for the cold part 15 to be re-designed. The hot part 16 of the bottom insert can remain unchanged. That also reduces the conversion costs in a situation involving a change in the preform design.

As can be seen in particular from FIG. 3 showing the assembled bottom insert, an annular space 20 is formed when the cold part 15 is inserted into the hot part 16, between the outside surface of the cold part 15 and the inside surface of the recess of the hot part 16. If now cooling fluid, for example cooling water, is introduced into the bottom insert by way of the feed 10, the cooling water flows around the cold part 15 and leaves the bottom insert again by way of the outlet 11. That configuration means that the inside contour of the recess of the cold side, that comes into contact with the preform, can be effectively cooled.

Heat transfer from the hot side to the cold side is markedly reduced by the arrangement of the thermal insulation between the cooling passage on the one hand and the hot side of the bottom insert on the other hand so that less heat has to be dissipated by way of the cooling passages and a markedly improved cooling action is thus afforded.

| List of references | |
|---|---|
| 1 | cavity structure |
| 2 | core |
| 3 | molding space |
| 4 | neck ring |
| 5 | support ring |
| 6 | bottom insert |
| 7 | feed passage |
| 8 | recess |
| 9 | cooling groove |
| 10 | feed |
| 11 | outlet |
| 12 | peripherally extending cooling grooves |
| 13 | screwthread |
| 14 | contour of the molding space |
| 15 | cold part |
| 16 | hot part |
| 17 | gate |
| 18 | O-rings |
| 19 | slot |
| 20 | annular space |

The invention claimed is:

1. A bottom insert for a mold cavity for the production of moldings of plastic material comprising a main body with a hot side which has a recess for receiving molten plastic material under pressure and a cold side having a recess, an inside contour of said cold side being arranged to come into contact with the molding to be produced and to shape the outside contour thereof, and a gate (17) which connects the recess of the hot side to the recess of the cold side and is intended to introduce molten plastic material from the hot side into the cold side, wherein there is provided a device for thermal insulation within the bottom insert between the hot side and the cold side of the bottom insert.

2. A bottom insert as set forth in claim 1 wherein the device for thermal insulation comprises a slot (19) provided in the main body, wherein the slot (19) is of such a configuration that by virtue of the provision of the slot (19) heat transfer surface area, in the form of an area perpendicularly to the flow of heat from the hot side to the cold side, is reduced in the region of the slot by at least 30%.

3. A bottom insert as set forth in claim 2 wherein the flow of heat from the hot side to the cold side, is reduced in the region of the slot by at least 50%.

4. A bottom insert as set forth in claim 2 wherein the flow of heat from the hot side to the cold side, is reduced in the region of the slot by at least 75%.

5. A bottom insert as set forth in claim 2 wherein the slot (19) is provided approximately in the region surrounding the gate.

6. A bottom insert as set forth in claim 2 wherein the slot (19) is so arranged that it surrounds the recess of the hot side at a portion in the proximity of the gate.

7. A bottom insert as set forth in claim 2 wherein the slot (19) comprises a substantially peripherally extending groove in the main body, wherein the groove is of a depth which is at least twice as large the width of the groove.

8. A bottom insert as set forth in claim 2 wherein the slot (19) is at least partially filled with a heat-insulating material.

9. A bottom insert as set forth in claim 1 wherein the bottom insert is of a two-part configuration having a hot part (16) which has the recess of the hot side and a cold part (15) which has the recess of the cold side.

10. A bottom insert as set forth in claim 9 wherein the two parts of the bottom insert (7) are separable.

11. A bottom insert as set forth in claim 9 wherein the hot part has an opening in opposite relationship to the recess of the hot side for receiving the cold part.

12. A bottom insert as set forth in claim 9 wherein the cold part and the hot part are sealed relative to each other.

13. A bottom insert as set forth in claim 12, wherein the cold part and the hot part are sealed relative to each other by O-rings (18).

14. A bottom insert as set forth in claim 1 wherein all surfaces which are provided for contact with the molding to be produced are arranged at the cold part.

15. A bottom insert as set forth in claim 9 wherein insulation in the form of an insulating coating, an insulating membrane, a spacing element or combinations thereof is present at a contact surface between the hot part and the cold part.

16. A bottom insert as set forth in claim 1 wherein a cooling passage is provided for the feed and discharge of a cooling fluid to and from the cold side.

17. A bottom insert as set forth in claim 11 wherein when the cold part is fitted into the opening in the hot part, a cooling space for receiving cooling fluid remains at least partly between the cold part and the hot part.

18. A bottom insert as claimed in claim 17 wherein the cooling space is at least partly in the form of part of a ring.

19. A bottom insert as set forth in claim 17 wherein a surface defining a cooling space at the cold part extends substantially parallel to an inside surface of the recess of the cold part, which surface comes into contact with the molding to be produced.

20. A bottom insert as set forth in claim 1 wherein the cold part has reinforcing elements in the region of the cold side recess.

21. A bottom insert as set forth in claim 20 wherein the reinforcing elements are in the form of reinforcing ribs.

* * * * *